Figure 1:
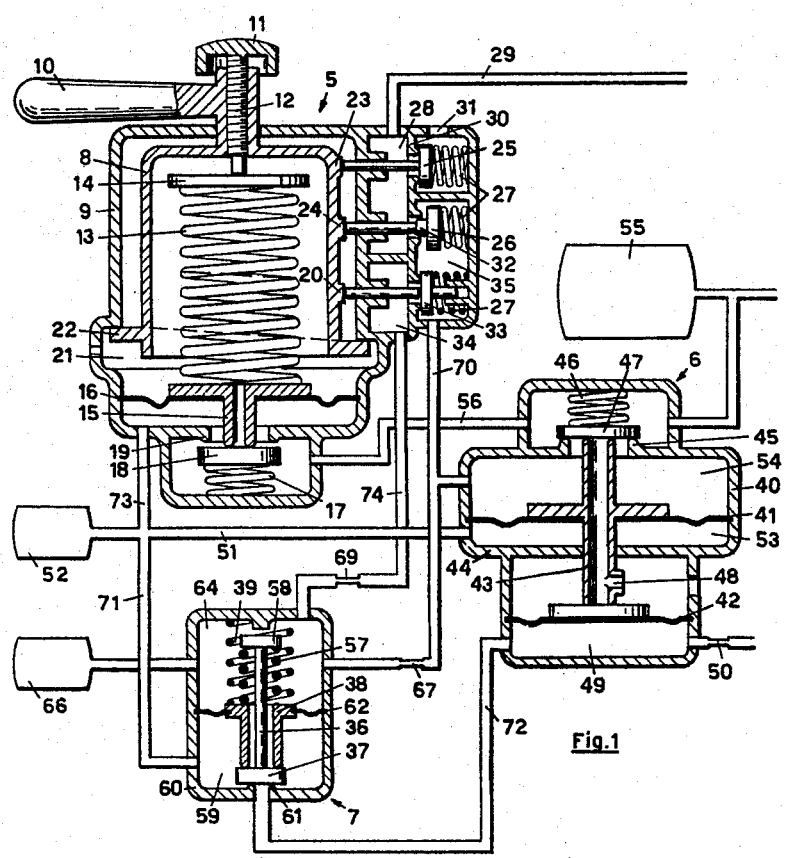

Oct. 25, 1960     S. KELLER ET AL     2,957,730
BRAKE SYSTEM CHARGING MEANS
Filed Sept. 26, 1955     2 Sheets-Sheet 2
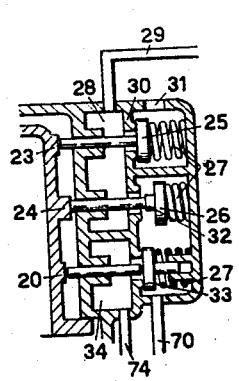
Fig. 2
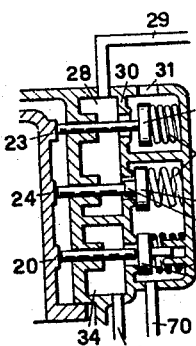
Fig. 3
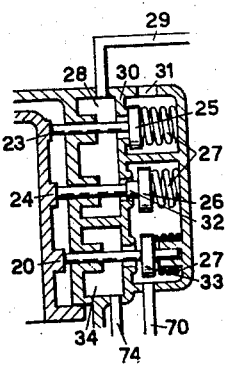
Fig. 4
Fig. 5
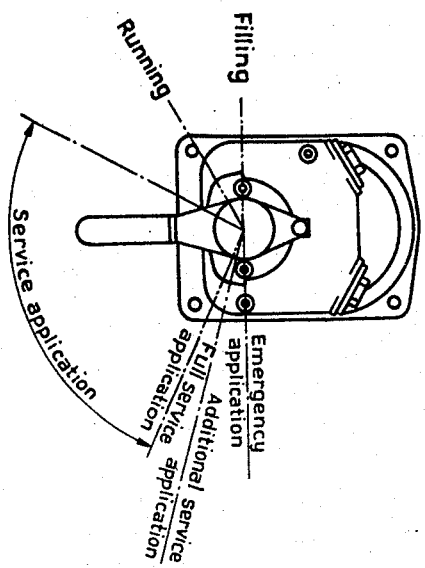
Inventors
Siegfried Keller
Walter Muller
Fritz Seger
By Wenderoth, Lind & Ponack
Attorneys United States Patent Office 2,957,730
Patented Oct. 25, 1960

2,957,730
BRAKE SYSTEM CHARGING MEANS

Siegfried Keller, Effretikon, and Walter Müller and Fritz Seger, Zurich, Switzerland, assignors to Machine Tool Works Oerlikon, Administration Company, Zurich-Oerlikon, Switzerland, a Swiss company Filed Sept. 26, 1955, Ser. No. 536,684

Claims priority, application Switzerland Mar. 26, 1955

4 Claims. (Cl. 303—59)

This invention relates to locomotive brake equipment in which the recharging of the brake pipe from the main reservoir is controlled by a relay valve and more particularly to equipment with a relay valve, which is provided with an additional pneumatic control member acting in the direction for opening said valve. With conventional brake equipment of this kind, the driver's lever is provided with a latch which has to be actuated by the driver in order to operate the additional control member. In service, this sort of latch complicates the operation of the brake equipment. Besides, it is preferable to operate the additional control member automatically at each step of release.

The primary object of the present invention is to provide a locomotive brake equipment of the above mentioned type with means to ensure an automatic operation of the additional control member at each step of release.

These and other objects and features of the present invention will be clearly understood from the following description of an embodiment thereof given by way of example with reference to the accompanying drawing, in which:

Fig. 1 diagrammatically shows the locomotive brake equipment including an engineer's brake valve device, a relay valve device and an auxiliary valve in the full service application position with empty reservoirs, in an axial section, and Figs. 2 to 4 show the positions of three valves controlled by the driver's lever in the filling position, emergency application position, and running position, respectively.

Fig. 5 is a plan view of the engineer's brake valve device showing different positions of the handle.

The engineer's brake valve device 5, the primary object of which consists in feeding the relay valve 6 with a control pressure reduced with respect to the pressure existing in the main air reservoir 55, has a bell shaped body 8 opening downwardly which is rotatably mounted in a casing 9. At the upper end of the body 8 which projects from the casing 9 the driver's lever 10 is attached, and moreover a bolt 12 carrying a cap 11 is screwed into this end, which bolt carries at its lower end a plate 14 bearing on the coiled spring 13. The lower end of this spring abuts on the plate-shaped end of a valve head 15 which is bored axially and is attached to a membrane 16. Against the lower end of the valve head 15 a valve plate 18 is biased by a spring 17, which valve plate abuts on a valve seat 19 formed in a partition wall of the casing 9 when the said valve head 15 moves upwardly. The lower end of the body 8 is provided with a flange 22 engaging into a recess 21 in the casing 9. The upper boundary of the recess 21, as indicated in Fig. 1 in dotted lines, forms part of a helical face, against which the flange 22 is biased by the spring 13. Both the beginning and the end of this helical face is continued by a flat portion which permits turning the body 8 without simultaneously shifting the same in the axial direction.

The outer cylindrical surface of the body 8 is provided with three guide tracks 20, 23 and 24, against which the stems of the three valve heads 25, 26 and 33 are pressed by the springs 27. The three stems are sealed and guided slidably in the wall of the casing 9, and engage into a chamber 28 communicating with the brake pipe 29 of the train, and into a further chamber 34, respectively. A partition wall 30 forms three wall seats for the valve heads 25, 26 and 33. When the valve head 25 is lifted off its seat (Fig. 3), the chamber 28 is put in communication with the ambient atmosphere through the bore 31. The valve head 26 is provided with a cylindrical extension 32 which in the position of the driver's lever 10 as illustrated in Fig. 1 in which the valve head 26 is lifted off its seat, throttles the area of the passage formed by the latter.

By the cam 24 the valve head 26 is raised in the filling position of the driver's lever 10 as shown in Fig. 2 to such an extent that the extension 32 clears completely the passage formed by the valve seat, whereas in the emergency application position shown in Fig. 3 the valve head 26 rests on its seat and blocks the communication between the chambers 28 and 35. The valve head 33 controls the communication between the two chambers 34 and 35. In the running position shown in Fig. 4 the stem contacting the guide track 20 is lifted off its seat, whereas in all other positions of the driver's lever it is forced against its seat by its biasing spring 27. The spring 27 biasing the valve head 33 is of a low force, so that the valve head is opened also when there is an excess pressure in the chamber 34 over that in chamber 35.

The driver's lever 10 can be set into the following positions:

(a) The running position, in which the body 8 is in its lowest position corresponding to the heaviest loading of the spring 13, and in which the valve 25 is closed, whereas the valves 33 and 26 are opened, the cylindrical extension 32 forming a throttling point;

(b) The filling position, in which the spring 13 is subject to the same loading as in the running position, and in which moreover the valve 25 is closed, the valve 26 is opened without any throttling action, and the valve 33 is closed;

(c) The service application positions, in which the flange 22 abuts on the said helical face, so that the loading of the spring 13 can be steadily reduced from the mavimum value of the running position to a value corresponding to the full service application position, and in which the valves 25 and 33 are closed, whereas the valve 26 is opened as in the running position with the formation of a throttling point;

(d) An additional service application position, which differs from the aforesaid service application positions only in that the spring 13 is unloaded to a value lying slightly below the value corresponding to the full service application position;

(e) The emergency application position, in which the loading of the spring 13 has the same value as in the additional service application position, and in which the valve 25 is opened, whereas the valves 26 and 33 are closed.

The outer margins of the two membranes 41, 42 are clamped in the casing 40 of the relay valve 6, to which membranes a hollow valve head 43 is attached. The latter is slidably guided in an opening of the partition wall 44 and reaches with its upper open end through an opening in a further partition wall forming a valve seat 45.

A valve plate 47 biased by a spring 46 cooperates with the valve seat 45 and serves as an abutment for the upper end of the valve head 43. The chamber enclosed between the partition wall 44 and the membrane 42 with which the interior of the valve head 43 is connected through a bore 48 is in communication with the ambient atmosphere. The pressure chamber 49 also called third pressure chamber lying below the membrane 42 is likewise in communication with the ambient atmosphere through a restricted orifice 50. A control chamber 53 also called first pressure chamber which is connected to the control reservoir 52 by a pipe 51, is separated by the membrane 41 from a chamber 54 connected to the brake pipe. To the chamber arranged on top of the valve seat 45 the main air reservoir 55 is connected which supplies at the same time also the chamber of the engineer's brake valve device with compressed air through the pipe 56, which chamber is situated below the valve seat 19.

In the casing 60 of the auxiliary valve 7 a fixed valve seat 61 is provided which co-operates with a valve head 37 attached on a stem 36. A sleeve 38 is pushed over the stem 36, which sleeve is biased on to the valve head 37 by a spring 39 abutting on the casing 60. A further spring 57 abutting on the upper end of the sleeve 38 bears on a plate 58 arranged at the upper end of the stem 36. The sleeve 38 is carried by a membrane 62 clamped into the wall of the casing 60, which membrane divides the interior of the casing 60 into two chambers 59 and 64, this latter chamber is also called fourth pressure chamber. The spring 57 is so dimensioned that it can not be overcome by a pressure difference prevailing between the chambers 59 and 64 not exceeding a limit value determined by the difference between the service pressure and a brake pipe pressure corresponding to full service application, and under the action of which the stem 36 is moved by the sleeve 38 until the plate 58 abuts on the wall of the casing 60. However, when a larger pressure difference prevails in these chambers, the sleeve 38 moves relative to the stem 36, and thereby opens the valve 37, 38 also called additional valve. To the chamber 64 on the one hand a timing reservoir 66 is connected in such a manner that the membrane 62 is subject on top to the pressure of this reservoir; on the other hand the chamber 64 is in communication through the restricted orifice 67 with a pipe 70 which leads from the chamber 54 connected to the brake pipe by means of chamber 35. The chamber 64 is moreover in communication with the chamber 34 through a pipe 74 containing the restricted orifice 69. The restricted orifice 69 is of a larger area than the orifice 67 so that the discharge of the timing reservoir 66 through the valve 33 takes place at a higher rate than the filling thereof through the orifice 67. The underside of the membrane 62 is subject to the pressure of the control reservoir 52 by the branch pipe 71 connected to the pipe 51, which pressure acts also on the membrane 42 owing to the connection 72, when the valve head 37 is lifted off its seat 61.

The manner of operation of the locomotive brake equipment described is as follows:

Assuming the driver's lever 10 to be in the position illustrated in Fig. 1 corresponding to a full service application in which the body 8 is placed a small amount below its highest position, and the spring 13 is accordingly but slightly loaded. In the chamber of the engineer's brake valve device connected by the branch pipe 73 to the control reservoir 52 there prevails accordingly the pressure corresponding to a full service application of about 3 atmospheres which balances the spring force adjusted by means of the cap 11. By the spring 17 the valve head 15 and the valve plate 18 are pressed upwardly until the latter rests on its seat 19 and blocks the access of compressed air deriving from the main air reservoir to the space below the membrane 16. Owing to the open valve 26, 30 there prevails in the chamber 54 connected to the brake pipe likewise the pressure of the brake pipe, and as long as this pressure exceeds the pressure in the control chamber 53, it forces the valve head 43 downwardly so that compressed air can emerge from the brake pipe 29 through the bore 48 into the open atmosphere. When the pressures in the two chambers 53, 54 are equal, this emerging flow is interrupted by the valve head 43 resting on the valve plate 47. Equality of pressure exists then likewise on both sides of the membrane 62, so that the valve head 37 is forced by the spring 39 and sleeve 38 on to its seat 61, and prevents the emerging of compressed air from the control reservoir 52 through the restricted orifice 50.

For the purpose of partly releasing the brakes of the train, the engineer turns the lever 10 into the position corresponding to a certain releasing stage whereby the body 8 is shifted downwardly, and the spring 13 is loaded more strongly, while the valves 25, 26 and 33 remain in the position illustrated. The valve plate 18 is thereby lifted off its seat 19, and compressed air flows from the main reservoir 55 to the space below the membrane 16 and from there into the control reservoir 52, into the control chamber 53 and into the space 59 below the membrane 62. The equilibrium of forces hitherto prevailing in respect of the two membranes 41, 62 is thereby disturbed, and the valve body 43 and sleeve 38 are raised. Thereby also the stem 36 is carried along by the spring 57, so that the valve head 37 keeps abutting on the lower end of the sleeve 38. Accordingly a communication is established between the chambers 59 and 49, while the communication between the chambers 59 and 64 through the bore 38 remains interrupted. By the upward movement of the valve head 43 the valve body 47 is lifted from its seat 45 and compressed air flows from the main reservoir 55 into the chamber 54 connected to the brake pipe 29 through the open valve 26, and from said chamber 54 through the restricted orifice 67 into the chamber 64 and into the timing reservoir 66. At the same time compressed air flows from the control reservoir 52 through the branch pipe 71 into the space below the membrane 62, and through the opened valve 37, 61 into the chamber 49. The restricted orifice 50 prevents the compressed air flowing into the chamber 49 from quickly expanding into the atmosphere. Therefore the pressure in the chamber 49 and below the membrane 62 rises immediately to the value adjusted by the driver's lever. No pressure drop in the control reservoir 52 takes place then, since any lowering of the pressure below the membrane 16 effects a restoring supply from the main air reservoir. The brake pipe 29 is gradually charged.

The cumulative effect of fluid pressure in chambers 53 and 49 is to over control or open valve 47 wide and thereby pass a large quantity of air to the brake pipe limited only by the flow capacity of the choked passage occasioned by the enlarged portion 32, of valve 26. The effect is to admit a surge of fluid pressure into the brake pipe to aid in the release of the brakes. Valve 47 tends to stay in the wide open condition. However, this condition is not maintained due to the rise of pressure in chamber 64 through choke 67 connected to the brake pipe charging passage 70. This permits a relatively rapid equalization of fluid pressure on diaphragm 62 to thereby permit closure of valve 37 by spring 39. The additional fluid pressure in chamber 49 acting in a direction to open valve 47 is rapidly dissipated through the restricted orifice 50 to the atmosphere to restore control of the charging relay to the control chamber 53 alone. The duration of the above over control cycle depends upon the degree of or magnitude of the change in setting of the driver's brake valve 5. Thus to a slight increase in the control pressure in reservoir 52 will correspond a smaller increase of the pressure in the chamber 49 than to a large increase of such control pressure. Accordingly the time, during which the compressed air contained in the chamber 49 influences the relay valve 6, will be the shorter, the smaller was the increase in pressure in reservoir 52.

When the engine driver turns the lever 10 into the running position in order to release the brakes completely, the valve head 33 is moved by its stem into the position shown in Fig. 4. The communication thus established from the chamber 54 connected to the brake pipe 29 through the pipes 70 and 74 and the restricted orifice 69 with the timing reservoir 66 effects a quicker charging of the timing reservoir 66 owing to the larger area of the restricted orifice 69 than that of the restricted orifice 67, so that in the chambers 59 and 64 practically the same pressure prevails throughout the whole releasing operation, and the valve head 37 is accordingly not lifted off its seat 61 and no compressed air reaches the chamber 49. Upon a release of the brake carried out in the running position of the driver's lever accordingly no high pressure charge impulse is sent into the brake pipe.

When, however, the driver's lever is turned beyond the running position into the filling position, the spring 13 is not loaded any further owing to the aforesaid flat portion at the one end of the helical boundary of the recess 21. The valve 33 is closed as in the case of partial brake release described above to render the valve 7 effective to over control the charging relay 6. A quicker charging of the brake pipe 29 also takes place, since according to Fig. 2 the extension 32 of the valve head 26 has now fully emerged from the opening formed in the valve seat 30 and thus obviating the restrictive effect imposed on the surge in partial release heretofore described. This has the further consequence that in the pipe 70 at the beginning of the charging of the brake pipe a lower pressure prevails than in the running or application positions, so that the timing reservoir 66 is charged more slowly. Therefrom results an increase of the duration of the high pressure charge in the release position of the lever. Besides, this duration is for the reasons stated hereinbefore in proportion to the strength of the preceding application.

In the additional service brake position the pressure in the brake line, as already mentioned, is lowered to a pressure which is below the one for the full braking. Such a lowering of the pressure in the brake line will be necessary, for instance, during long inclined drives on account of leakiness in the control pressure reservoirs of the brake equipment of the different cars of a train.

In the emergency application position shown in Fig. 5 the spring 13 retains the same tension as in the additional service application position, but the valves 25, 26 are adjusted by the guides 23, 24 into the position illustrated in Fig. 3. The valve 25 then connects the brake pipe 29 through the opening 31 directly to the ambient atmosphere, while the valve 26 interrupts the communication of the chamber 28 with the pipe 70. This has the consequence that after the pressure in the brake pipe has dropped to zero, the pressure in the chamber 54 connected to the brake pipe, and the pressure in the chamber 64 are kept at a value corresponding to the additional service application position.

For a graduated or the full release of the brakes of the train after adjustment of the driver's lever into the additional service application position or the emergency application position, the said lever 10 is turned into the position for service application or in one of the two positions termed "running" and "filling" in Fig. 5. When it is turned into the filling position, the pressure rises in the chambers 53 and 59 immediately to service pressure, while in the chamber 64 owing to the restricted orifice 67 the pressure rises only gradually beyond the amount of the brake pipe pressure corresponding to the additional service application position or the emergency application position respectively. Consequently there results a pressure difference between the chambers 59 and 64 exceeding the limit value mentioned before. This greater pressure difference is, as has also been explained before sufficient for overcoming the spring 57. The valve 37, 38 is opened in the manner described and permits compressed air to flow from the pipe 71 through the sleeve 38 into the chamber 64, so that an accelerated charging of the timing reservoir 66 takes place diminishing the pressure difference between the chambers 59 and 64, until this difference reaches the said limit value. At this moment the valve 37, 38 is closed by the spring 57, and the accelerated filling of the timing reservoir 66 is terminated. In this manner a high pressure charge is effected the duration of which is reduced approximately to the same value as used in a release of the brakes of a train following a full service application.

In order to initiate an emergency application, the lever 10 is turned beyond the additional service application position. The spring 13 retains in this position an appropriate loading, but the valves 25, 26 are adjusted by the guides 23, 24 into the position illustrated in Fig. 3. The valve 25 then connects the brake pipe 29 through the opening 31 directly to the ambient atmosphere, while the valve 26 interrupts the communication of the chamber 28 with the pipe 70. This has the consequence that after the pressure in the brake pipe has dropped to zero, the pressure in the chamber 54 connected to the brake pipe, and the pressure in the chamber 64 are kept at a value corresponding to full service application.

While we have herein described and illustrated in the accompanying drawings what may be considered a typical and particularly useful embodiment of our said invention, we wish it to be understood, that we do not limit ourselves to the particular details and dimensions described and illustrated, for obvious modifications will occur to a person skilled in the art.

What we claim as our invention and desire to secure by Letters Patent, is:

1. A locomotive brake equipment with a brake pipe and a reservoir charged with fluid pressure, in combination, normally closed valve means connecting said reservoir to said brake pipe; operating means for said valve means including a first pressure chamber normally connected to said brake pipe, second and third pressure chambers and movable elements closing said pressure chambers, the pressures in said second and third pressure chambers acting to open said valve means against the pressure in said first pressure chamber; pressure reducing means having an adjustable lever and connecting said reservoir to said second pressure chamber to feed the latter with a control pressure reduced with respect to the pressure in said reservoir, said control pressure being continuously variable by adjusting said lever; a second valve means connecting said pressure reducing means with said third pressure chamber; a second operating means for said second valve means comprising a fourth pressure chamber and a movable element closing said fourth pressure chamber and loaded by said control pressure to open said second valve means responsive to a difference of pressure between said control pressure and the pressure in said fourth pressure chamber and to close said second valve means upon an equalization of said difference of pressure; pressure transmission means establishing a permanent connection between said first pressure chamber and said fourth pressure chamber comprising delaying means to delay the transmission of pressure from said first pressure chamber to said fourth pressure chamber upon a rise of pressure in said first pressure chamber during the release of the brake equipment, thereby to produce a difference of pressure operating said second valve means for substantially establishing said control pressure in said third pressure chamber, a second pressure transmitting means arranged between said first and said fourth pressure chamber, comprising a check valve which prevents the pressure transmission from said first pressure chamber to said fourth pressure chamber and opens in the opposite direction in order to effect an additional discharge via said second pressure transmitting means from said fourth pressure chamber to said first pressure chamber which takes place during the lowering of the pressure, during braking, in said first pressure chamber and means for producing a decrement of pressure in said third pressure chamber after closure of said second valve means.

2. A locomotive brake equipment as set forth in claim 1 comprising a valve body forming part of said second valve means and being movable relatively to said movable element, an additional valve including said valve body and said movable element and connecting said pressure reducing means with said fourth pressure chamber, spring means engaging said valve body and said additional valve means, an abutment for said valve body normally out of engagement with said valve body, to open said additional valve by arresting the said valve body relatively to said movable element upon a movement of the latter responsive to a difference between said control pressure and the pressure in said fourth pressure chamber.

3. A locomotive brake equipment as claimed in claim 1, wherein said adjustable lever in filling position connects said first chamber unrestrictedly to said brake pipe, and in the emergency application position blocks the communication between said first chamber and said brake pipe.

4. A locomotive brake equipment as claimed in claim 1, comprising a part for the opening of said check valve in a driving direction of said adjustable lever, said part being in driving connection with said adjustable lever and cooperating with said check valve.

References Cited in the file of this patent

UNITED STATES PATENTS

| | | |
|---|---|---|
| 792,152 | McElroy | June 13, 1905 |
| 1,496,452 | De Camp | June 3, 1924 |
| 1,816,078 | Farmer | July 28, 1931 |
| 2,273,953 | Gorman | Feb. 24, 1942 |
| 2,543,099 | Eaton | Feb. 27, 1951 |

OTHER REFERENCES

Publication: Organ für die Fortschritte des Eisenbahnwesens, 75 Bard 1938, pages 145 to 151.